United States Patent [19]

Hamilton

[11] Patent Number: 5,048,226

[45] Date of Patent: * Sep. 17, 1991

[54] APPARTUS FOR SELECTING AND DISCHARGING SEEDS

[75] Inventor: Thomas W. Hamilton, Stoke Poges, United Kingdom

[73] Assignee: T W Hamilton Design Limited, United Kingdom

[*] Notice: The portion of the term of this patent subsequent to May 22, 2007 has been disclaimed.

[21] Appl. No.: 486,439

[22] Filed: Feb. 28, 1990

Related U.S. Application Data

[63] Continuation of Ser. No. 174,247, Mar. 28, 1988.

[30] Foreign Application Priority Data

Apr. 11, 1987 [GB] United Kingdom ................ 8708734

[51] Int. Cl.$^5$ .............................................. A01G 1/04
[52] U.S. Cl. ..................................... 47/1.01; 221/211; 221/233
[58] Field of Search ................. 47/1.01; 221/211, 278, 221/233; 222/272, 271; 111/179, 1, 34, 77; 198/397, 493, 443, 453

[56] References Cited

U.S. PATENT DOCUMENTS 4,516,690 5/1985 Anderson ............................. 221/233
4,741,428 5/1988 Taniguchi et al. ............... 221/211 X Primary Examiner—David A. Scherbel
Assistant Examiner—Linda J. Watson
Attorney, Agent, or Firm—Christie, Parker & Hale

[57] ABSTRACT

A seeding machine has a drum and roller urged together to define a seed trough. Bristles close one end of the trough and a hopper adjacent that end feeds a continuous supply of seeds to the trough. The seeds flow along the length of the trough and are discharged at the opposite end of the trough which is open. A funnel collects the discharged seeds and returns them to the hopper. The drum is provided with a series of axially extending rows of holes which are coupled to a vacuum source as each row passes through the tumbling seeds in the trough. A single seed is attracted to each hole and is carried by the drum to a discharge location where the hole in question is disconnected from the vacuum source and instead connected to a source of pressure which then acts to eject the seed from the drum.

10 Claims, 4 Drawing Sheets

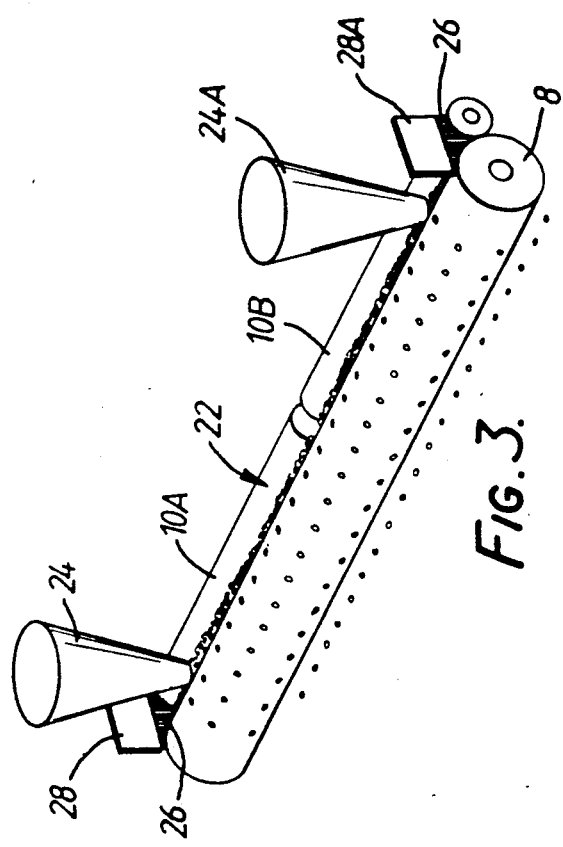
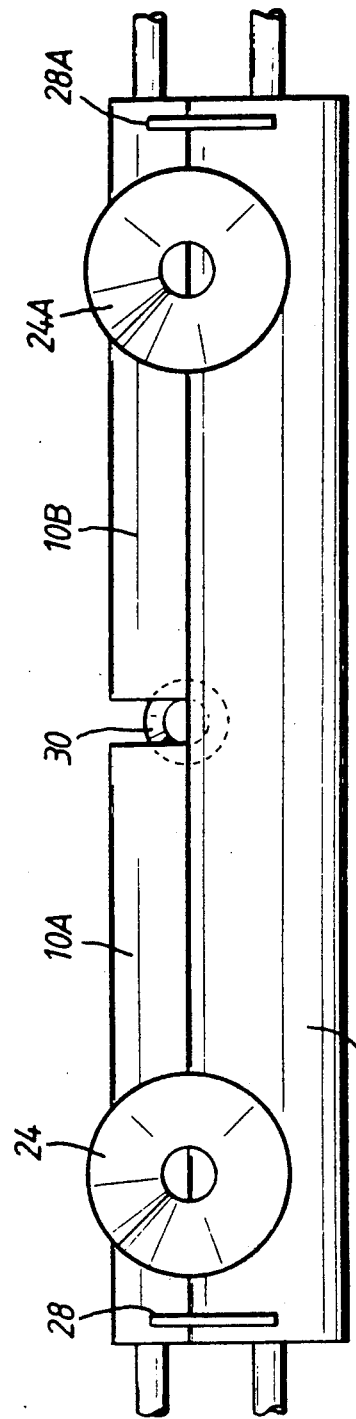

APPARTUS FOR SELECTING AND DISCHARGING SEEDS

This is a continuation of application Ser. No. 07/174,247 filed Mar. 28, 1988.

BACKGROUND OF THE INVENTION

1. Field of the Invention

The present invention relates to seeding machines.

2. Description of the Prior Art

A previously proposed seeding machine comprises a rotary drum partially immersed in a reservoir containing seeds. The drum has a plurality of holes in its outer circumferential surface, which holes can alternately be connected to a source of vacuum and source of pressure. As each hole passes through the mass of seeds in the reservoir, the vacuum applied draws the nearest seed to close or partially close the hole. As the drum rotates the attracted seed is lifted out of the mass of seeds and when the seed reaches a discharge position a source of pressure is applied to the particular hole to shoot the seed to a desired discharge tube or location. The disadvantage of this arrangement is that the seeds in the mass of seeds do not move readily so that when seeds are picked out of the mass at a predetermined withdrawal location, they are not readily replaced by adjacent seeds. Instead a hole is created in the mass at the withdrawal location so that no further seeds are withdrawn. A further problem which occurs because the seeds do not have sufficient mobility is that a seed attracted to a hole and carried round by the drum may well engage a seed located in front of it and push the seed along towards the discharge position.

This renders the seeding arrangement inefficient since not only is it wasteful of seeds, but when two seeds are planted at the same location, one of the resulting seedlings has to be picked out, usually manually, and this is then wasteful of manpower.

It is an object of the present invention to provide an improved seeding machine.

SUMMARY OF THE INVENTION

According to the present invention there is provided a seeding machine comprising first and second movable surfaces constrained to make contact along a common axis and thereafter separating to define a seed trough, means for displacing the surfaces away from the common axis to cause any seeds in the trough to tumble continuously, one of said surfaces defining a plurality of openings which can be coupled to a source of pressure difference to attract an individual seed to each opening and to allow the surface to carry the individual seeds to a location for discharge.

According to the present invention there is further provided a seeding machine comprising a rotary drum defining a plurality of axially extending rows of openings, a roller urged into contact with the drum to define with the drum a seed trough, means for rotating the drum and the roller in opposite senses so that the facing surfaces of the drum and roller are continuously rising out of the trough to tumble any seeds which have been deposited in the trough, and means for effecting a pressure difference across each opening to cause it to attract a seed as it passes through the trough and to carry the attracted seed to a location for discharge.

BRIEF DESCRIPTION OF THE DRAWINGS

Seeding machines embodying the present invention will now be described, by way of example, with reference to the accompanying diagrammatic drawings, in which:

FIG. 3 is a fragmentary perspective view of a second machine embodying the invention;

FIG. 4 is a plan view of the machine of FIG. 3, to an enlarged scale.

DESCRIPTION OF THE PREFERRED EMBODIMENT

Figure 1:
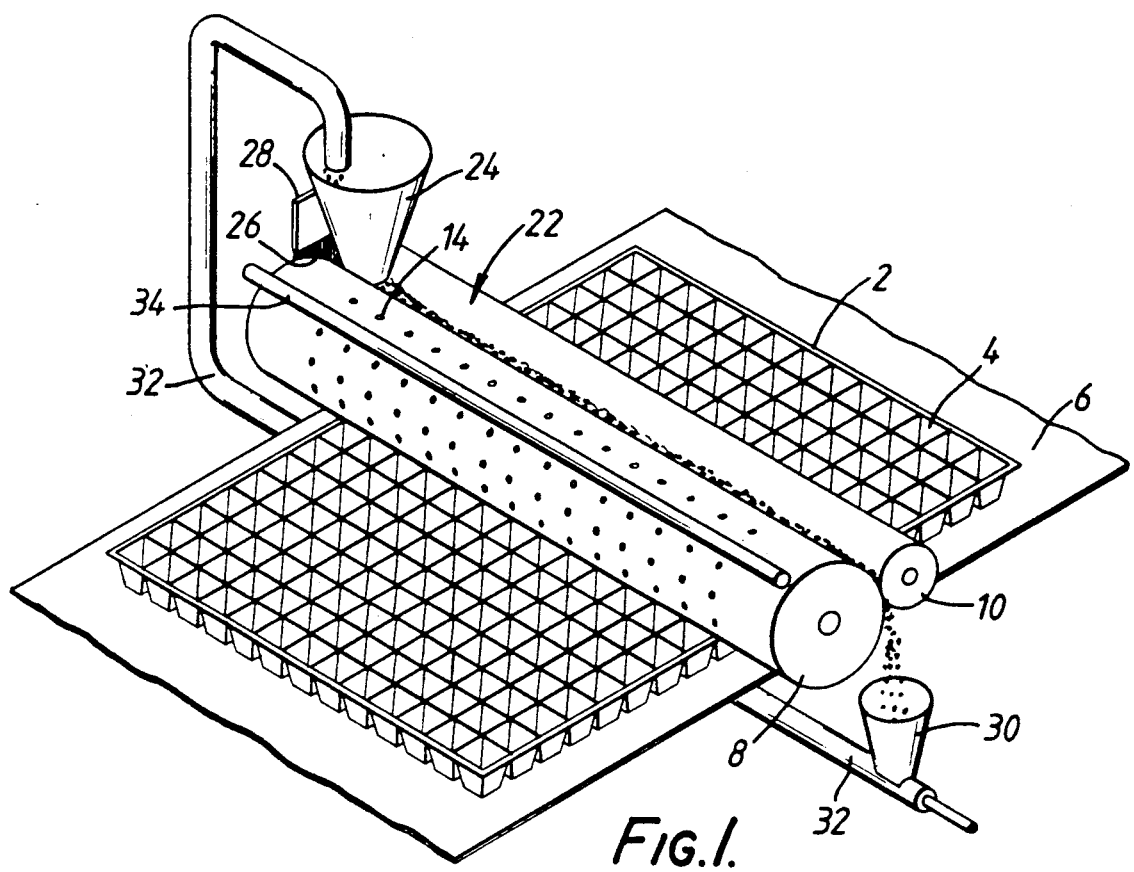
FIG. 1 is a perspective view of a first machine embodying the invention.
Figure 2:
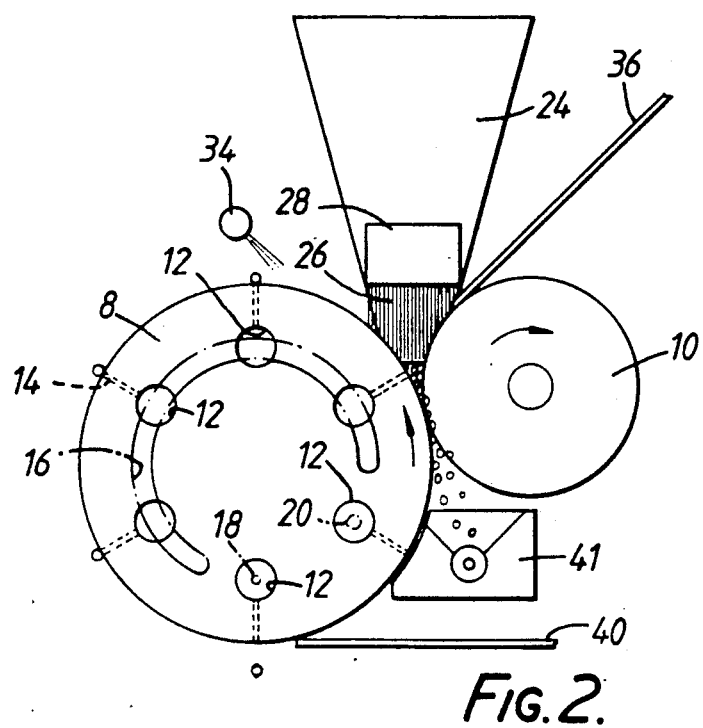
FIG. 2 is an end elevation of the machine of FIG. 1.

The seeding machine shown in FIGS. 1 and 2 is arranged to dispense seeds one row at a time into a seed tray 2 having rows and columns of individual pockets 4 filled with a seed compost (not shown). The seed tray 2 is arranged to be displaced through the seeding machine by a conveyor belt 6 which carries the tray 2.

The machine comprises an elongate rotary drum 8 and an elongate rotary roller 10 arranged in mating engagement with the drum 8. The drum 8 and roller 10 are mounted between two spaced side plates (not shown) by bearings (not shown) with their axes extending parallel to one another. The drum 8 is provided with a plurality of internal axially extending equi-angularly spaced air channels 12 (see FIG. 2). Each channel 12 communicates with a corresponding axially extending row of holes 14 in the circumferential surface of the drum. At one axial end, the drum 8 is in sliding contact with a support plate (not shown). An arcuate groove 16 in the support plate and coupled to a source of vacuum (not shown) is located along the locus of the adjacent axial ends of the channels 12. Thus as each channel 12 becomes aligned with the arcuate groove 16, the channel 12 is subjected to a vacuum.

Along the same locus but spaced from the arcuate groove 16 are two circular apertures 18 and 20 of different size. Each aperture is coupled to a source of pressure (not shown). As each channel 12 becomes aligned with the apertures 18 and 20, the channel is subject to a blast of air under pressure.

The drum 8 and the roller 10 define a trough 22 into which seeds can be poured. A hopper 24 is provided adjacent one end of the trough 22 to feed a constant supply of seeds to the trough 22. The hopper 24 may have an adjustable outlet to regulate the flow rate of seeds therefrom. Extending into the trough at the end adjacent the hopper 24 is a wall of bristles 26 mounted on a support 28. The wall of bristles 26 prevents any seeds from falling out of the trough 22 at that end. The opposite end of the trough 22 is open. A funnel 30 is located below the open end of the trough 22 to catch the seeds falling therefrom. The funnel 30 communicates with a conduit 32 which extends parallel to the axis of the drum 8 and roller 10 and passes under the roller 10 to rise at the other side to a position where it is directed downwardly into the hopper 24. The conduit 32 is supplied with air under pressure which drives any seeds entering the conduit 32 from the funnel 30, along the conduit to be discharged into the hopper 24.

A hollow tube 34 extending parallel with the drum 8 is located above the drum 8. The tube 34 which is connected to a source of pressure (not shown) is provided with a row of holes to direct air jets at the surface of the drum 8 to dislodge any seeds, clinging only loosely to the drum surface, back into the trough 22.

A doctor blade 36 engages the roller 10 in an upper portion of the trough 22 to dislodge any seeds clinging to the surface of the roller 10 to return them to the trough 22.

A drive assembly (not shown) drives the roller 10 and the drum 8 in opposite senses so that the surfaces of the roller 10 and drum 8 which define the opposite walls of the trough 22 are always rising upwardly out of the trough 22.

In operation when a seed tray 2 is to be planted with seeds, the seed tray 2 is indexed under the drum 8 at the same pace as the circumferential speed of the drum 8. The hopper 24 is loaded with a supply of seeds which run from the base of the hopper along the trough 22 to spill out of the end of the trough into the funnel 30. Seeds entering the funnel 30 are then returned to the hopper along the conduit 32 by an air flow. The drum 8 and the roller are rotated in opposite directions so that the rising sides of the trough 22, which are in frictional engagement with the seeds, raise the seeds to a level at which they fall again under gravity. The seeds in the trough 22 are thus kept continually in motion which helps the flow of seeds along the trough 22 and also tends to effect the separation of seeds from one another.

As the drum rotates, each row of holes enters the trough 22 in turn. As soon as a row of holes has entered the trough 22 the conduit 12 with which the row is associated, communicates with the arcuate groove 16 and the holes are subjected to a vacuum. The vacuum force draws a seed from the trough 22 to close or partially close each hole in the row. The vacuum for each row of holes is held while the row moves through the highest point of the drum until it approaches the lowest point. At this point the conduit 12 associated with the row becomes disconnected from the arcuate groove 16 and the vacuum force to the holes ceases. Some of the seeds will now drop into respective pockets 4 in the tray 2 waiting below. With continual rotation of the drum 8 the conduit 12 is brought into alignment with the small aperture 18 which then supplies low pressure air to the holes to dislodge, into the waiting pockets 4, any seeds which did not become released from the drum 8 upon discontinuance of the vacuum. As the drum 8 continues to rotate a doctor blade 40 of Tufnol or similar material scrapes any stubborn remaining seed from the drum surface. Finally when the conduit 20 aligns itself with the larger aperture 20 a much stronger blast of air is applied to the row of openings with a view to unclogging any aperture which had become inadvertently clogged.

As the row of holes rises again into the trough 22 the whole cycle is repeated.

The fluid nature of the seeds as they are tumbled in the trough assists in attracting seeds to the hole but there will inevitably arise the occasion where two or even three seeds are held against one hole by the vacuum or one seed will carry another in front of it. The provision of the tube 34 with air jets which are directed towards the holes, tends to unsettle any grouping of seeds around a single hole and to blow any seeds which become thus released from the vacuum forces, back into the trough 22.

The air jet from the tube 34 is preferably arranged at an angle of 45° to the tangent to the portion of the drum 8 lying directly below the tube 34. The tube 34 may be provided with an additional jet for each hole in the drum directed to blow any seeds away from the trough. The two jets in the tube 34 for each hole in the drum may be arranged at 90° to each other. Excess seeds removed by this jet are caught in the trough 41.

Figure 5:
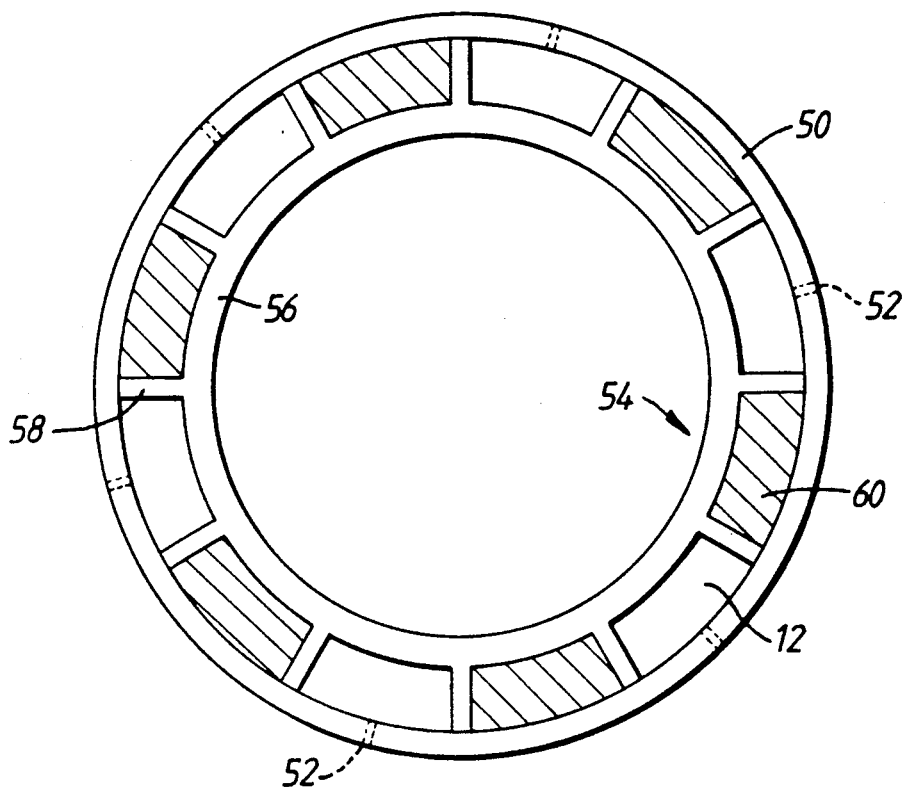
FIG. 5 is an end elevation of a drum for the seeding machine.
Figure 6:
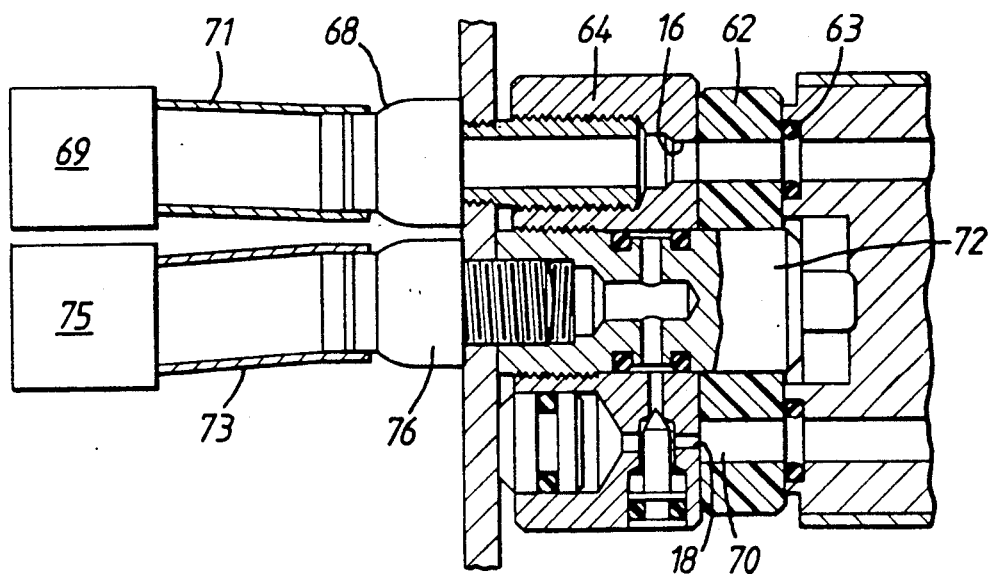
FIG. 6 is a longitudinal section through a drum support assembly.

In the seeding machine shown in FIGS. 3 to 5 parts similar to those in FIGS. 1 to 2 are similarly referenced. As shown two hoppers 24 and 24A are provided one adjacent each end of the trough 22. Also the walls of bristles 26 and 26B are provided one at each of the two opposite ends of the trough 22.

Instead of a single roller engaging the drum 8, two half length rollers 10A and 10B are provided axially spaced from one another, to leave a central gap in the trough 22 through which seeds can fall. A funnel 30 located below the gap collects the fallen seeds and by means of an air assisted return conduit feeds the collected seeds back to one or both hoppers 24 and 24B.

With this arrangement the distance the seeds have to travel along the trough is halved and so a smoother and more uniform flow of seeds is ensured.

In a modification of the arrangement shown in FIGS. 3 and 4 the recirculation device is omitted and instead the rate at which seeds are fed from the two hoppers is controlled by gate valves (not shown) adjacent the lower part of the hoppers.

One embodiment of the drum is shown in more detail in FIG. 5. As shown the drum is formed from two components, an outer sleeve 50 of hard anodised aluminium with holes 52 arranged in separate axially extending rows, and an inner core 54 of cast aluminium comprising an inner cylinder 56 with twelve radially projecting equi-angularly spaced fins 58. When the drum is assembled, the inner core 54 is placed within the outer sleeve 50 so that the distal ends of the fins seal against the inner wall of the sleeve 50. This can be accomplished by adopting shrink fit procedures, using adhesives, or even welding. The fins define twelve axially extending channels. For normal seeding operations only six channels are needed and so every alternate channel is filled with an impermeable medium 60. The remaining six intervening channels communicate with respective rows of holes.

The drum is sealed at one axial end and to the other axial end is secured an annular ring 62 of plastics impregnated with graphite. O-rings 63 provide a seal between each channel in the drum and respective ones of six through holes 70 in the annular ring 62. The annular ring 62 is mounted on a stub shaft 72 extending from an end support 62. The end support 64 has an annular end face which is in sliding engagement with the annular ring 6. This annular end face is profiled to define the arcuate groove 16 and the two apertures 18 and 20 shown in FIG. 2. The end support 64 carries a coupling spigot 68 which is coupled to a source of vacuum 69 through a hose line 71, the coupling spigot 68 being in communication with the groove 16. The end support also carries another coupling spigot 70 which is coupled to a source of pressure 75 by a hose line 73; the coupling spigot 70 being in communication with the two apertures 18 and 20.

The drum 8 is driven by an electric motor (not shown). The drum 8 and the roller 10 are coupled by gears to ensure that their surface velocity is the same at the point of contact between the roller 8 and the drum 10. The roller 80 is narrow and positioned opposite an intermediate section of the roller 10 to provide pressure on the roller 10 and hence on the drum to ensure close contact between the drum and the roller. Another advantage of this arrangement is that the rollers 10 and 80 can be easily separated for cleaning or servicing purposes.

Figure 7:
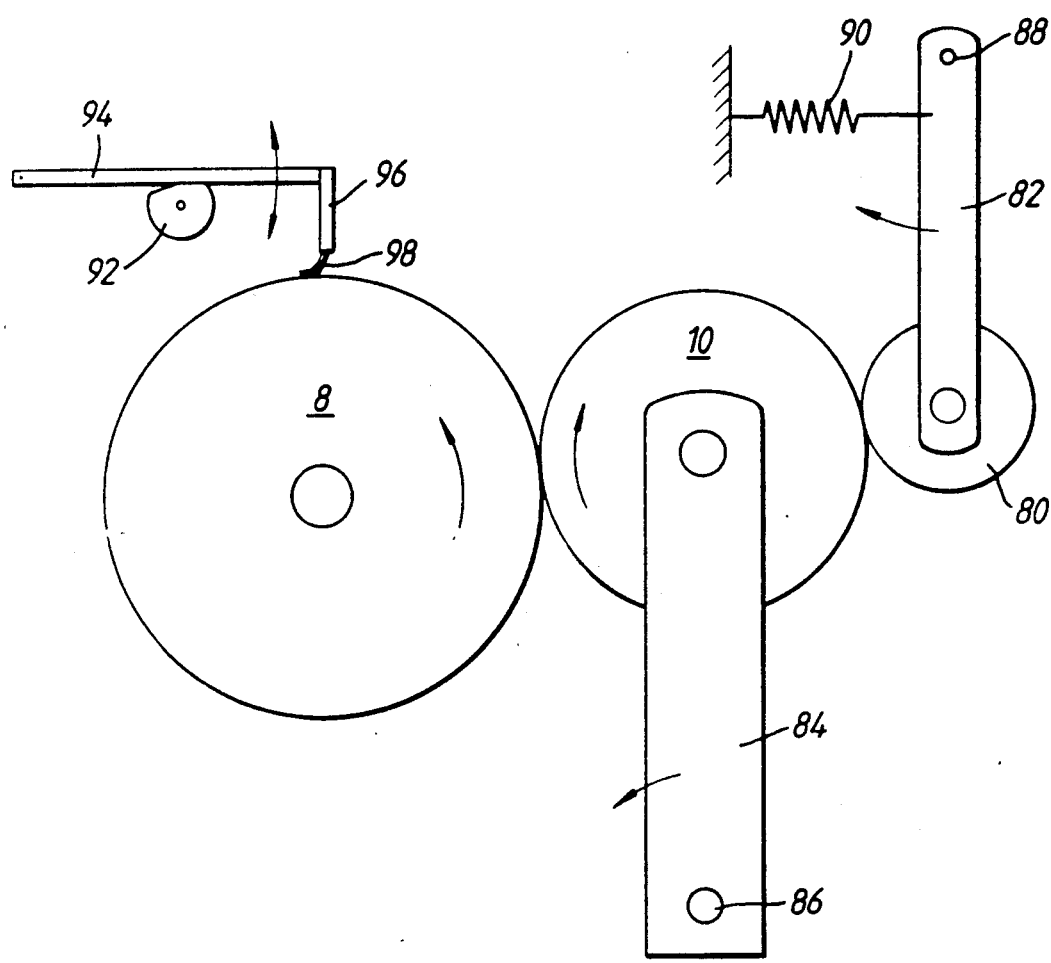
FIG. 7 is a side elevation of the drum and roller drive assembly of the machine.

FIG. 7 also shows a modification for sweeping the drum 8 clean from unwanted seeds. A pivotally supported arm 94 carries a brush head 96 at its free end. Bristles or rubber strips extending from the brush head engage the drum. As the drum 8 rotates the bristles sweep the drum clean. A rotary cam 92 engaging the arm 94 is rotated in synchronism with the drum so that each time a row of holes in the drum passes the bristles, the arm 94 and therefore the bristles are lifted to allow the holes and the seeds which are attracted to the holes free passage. As soon as each row of holes has passed the cam 92 allows the arm 94 to drop to bring the bristles back into engagement with the drum again.

While a presently preferred embodiment of the present invention has been illustrated and described, modifications and variations thereof will be apparent to those skilled in the art given the teachings herein, and it is intended that all such modifications and variations be encompassed within the scope of the appended claims.

I claim:

1. A seeding machine comprising:
   first and second movable surfaces, making contact along a common axis and thereafter separating to define a seed trough;
   means for moving the surfaces away from the common axis to cause any seeds in the trough to tumble continuously, one of said surfaces defining a plurality of openings;
   a source of pressure difference; and
   means coupling said openings to said source of pressure difference to enable an individual seed to be attracted to each opening and to allow said one surface to carry the individual seeds to a location for discharge.

2. A seeding machine comprising:
   a rotary drum defining a plurality of axially extending rows of openings;
   a roller;
   means supporting the roller and the drum and urging the roller into contact with the drum to define with the drum a seed trough;
   means for rotating the drum and the roller in opposite senses so that the facing surfaces of the drum and roller are continuously rising out of the trough to tumble any seeds which have been deposited in the trough; and
   means for producing a pressure difference across each opening to cause the opening to attract a seed as it passes through the trough and to carry the attracted seed to a location for discharge.

3. A machine according to claim 2 including a seed hopper mounted above the trough to feed the trough with a continuous supply of seeds so as to induce a flow of seeds along the trough.

4. A machine according to claim 3 including means positioned to collect the overflow of seeds from the trough and to return them to the hopper.

5. A machine according to claim 2 including air jet means located above said drum and arranged to direct an array of air jets at said rows of holes as they emerge from the trough to disturb any clusters of seeds congregated around a single hole and to direct any seed dislodged from said cluster back to said trough.

6. A machine according to claim 5 wherein said air jet means includes a second array of air jets directed at said rows of holes after they have passed the air jet means to provide a further disturbance to any remaining clusters of seeds.

7. A machine according to claim 2 including:
   brush means mounted adjacent the drum for sweeping the outer surface of said drum as it emerges from said trough; and
   cam means coupled to the brush means for lifting the brush means from said drum as each row of holes passes the brush means whereby the seeds carried by each row are undisturbed by the brush means.

8. A machine according to claim 2 including:
   a pivotal support supporting said roller for movement towards and away from the drum;
   an engagement roller also mounted on a pivot support; and
   biasing means for biasing the engagement roller into engagement with the first mentioned roller to urge the first mentioned roller into tight engagement with the drum.

9. A machine according to claim 2 wherein said drum comprises:
   an inner core having a cylindrical member carrying a plurality of circumferentially spaced radially extending fins; and
   an outer sleeve encircling the core so that the distal ends of the fins sealingly engage the inner wall of the sleeve so as to define a plurality of axially extending air channels, said outer sleeve defining rows of holes, each row being in communication with a different one of said channels.

10. A machine according to claim 9 wherein said drum is of hard anodized aluminum.

* * * * *